455-296 SR

FIP8106 XR 2,664,545

(2)

Dec. 29, 1953 E. McP. LEYTON 2,664,545

REDUCTION OF THE ANGLE-MODULATION OF
AMPLITUDE-MODULATED OSCILLATIONS
Filed May 2, 1950

Inventor
ERIC McPHAIL LEYTON
By Ralph E. Atherton
Attorney

Patented Dec. 29, 1953 2,664,545

UNITED STATES PATENT OFFICE 2,664,545

REDUCTION OF THE ANGLE-MODULATION OF AMPLITUDE-MODULATED OSCILLATIONS

Eric McPhail Leyton, London, England, assignor to Electric & Musical Industries Limited, Hayes, England, a company of Great Britain Application May 2, 1950, Serial No. 159,414

Claims priority, application Great Britain May 3, 1949

2 Claims. (Cl. 332—37)

This invention relates to circuits for reducing the angle-modulation of amplitude-modulated oscillations. It is sometimes required to remove phase and/or frequency modulation from amplitude-modulated carrier oscillations, so as to provide oscillations which are substantially only amplitude-modulated. Such a requirement may arise in the case where single sideband amplitude-modulated oscillations are required to be dealt with, the removal of one of the sidebands resulting in the resultant oscillations being angle-modulated.

The object of the invention is to provide an improved circuit for this purpose.

According to the invention there is provided a circuit for removing angle-modulation, comprising a source of amplitude-modulated oscillations having undesired angle-modulation, means for generating oscillations of constant amplitude and of a constant frequency which is different from the frequency of said modulated oscillations, means for combining said amplitude-modulated oscillations with said constant frequency oscillations to provide further oscillations of frequencies which are the sum and difference frequencies of said modulated oscillations and said constant frequency oscillations, means for selecting, from said further oscillations, one of said kinds of oscillations, means for combining said selected oscillations with said amplitude-modulated oscillations to provide resultant oscillations at frequencies which are the sum and difference frequencies of said selected oscillations and said modulated oscillations, and means for selecting, from said resultant oscillations, oscillations at said constant frequency amplitude-modulated and substantially free from angle-modulation.

Figure 1:
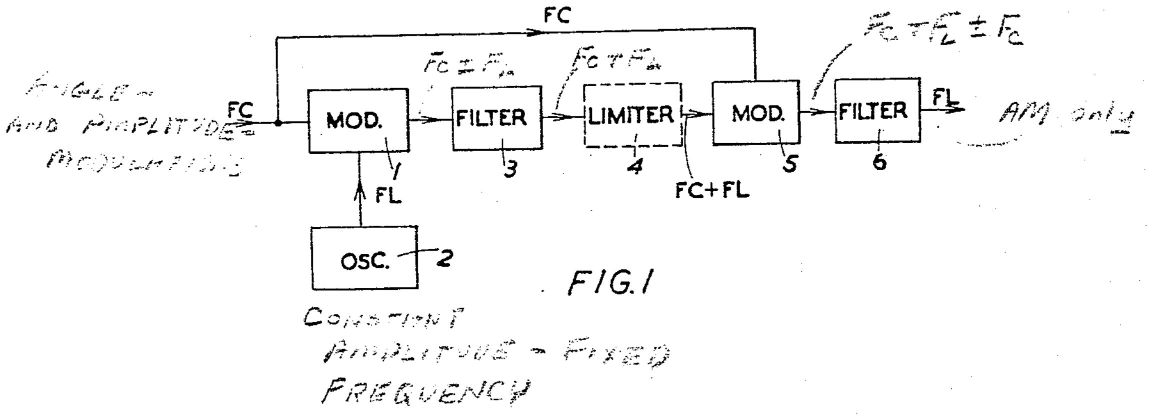
Figure 2:
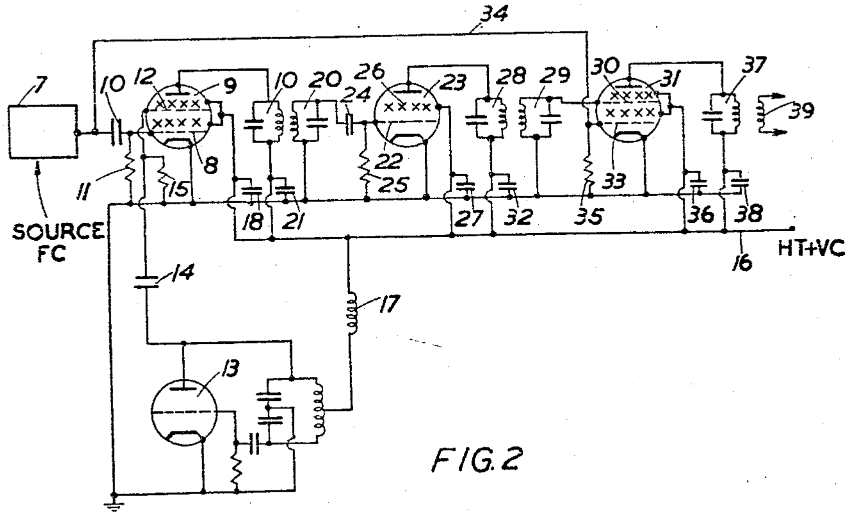

In order that the said invention may be clearly understood and readily carried into effect, the same will now be more fully described with reference to the accompanying drawing, Figure 1 of which is a block diagram of a circuit according to one form of the invention, and Figure 2 illustrates a circuit arrangement suitable for use according to the invention.

In the embodiment of the invention shown in the drawing, the circuit is intended to remove angle-modulation from amplitude-modulated carrier oscillations of frequency $F_c$. The amplitude-modulated carrier oscillations are fed to the input circuit of a modulator 1, Figure 1, and other oscillations of constant amplitude and of predetermined frequency $F_L$, preferably of lower frequency than the frequency $F_c$, and generated by a local oscillator 2 are also fed to modulator 1. The oscillations are combined in modulator 1 so as to provide in the output of modulator 1 further oscillations of frequencies $F_c+F_L$ and $F_c-F_L$. This output is fed to a filter 3, which passes only signals of frequency $F_c+F_L$ and sidebands thereof. The output from filter 3 is fed, in some cases via a limiter 4 as will be described hereinafter, to a second modulator 5 to which are also fed the carrier oscillations of frequency $F_c$. The oscillations fed to modulator 5 are combined therein so as to provide in the output of modulator 5 resultant oscillations of frequency $F_c+F_L-F_c=F_L$, and $F_c+F_L+F_c$. This output is applied to a filter 6 which passes only signals of frequency $F_L$ and sidebands thereof.

Thus the output of filter 6 comprises oscillations of the same frequency as the oscillations generated in oscillator 2, and any change in the phase or frequency of the amplitude-modulated carrier oscillations will not produce any corresponding change in the frequency of the oscillations in the output of filter 6, with the result that the angle-modulation of the carrier oscillations is effectively removed.

Amplitude-modulation of the carrier oscillations will, however, result in amplitude-modulation of the output from filter 6 in the same sense. The law connecting the way in which the amplitude of said output changes with the amplitude-modulation of the carrier oscillations, will of course depend upon the type of circuit employed for the modulators 1 and 5. The amplitude modulation is of course to be distinguished from the actual amplitude of the carrier oscillations, which may be modified by the presence of phase or frequency modulation. It is generally required that the amplitude-modulation of the carrier oscillations should be reproduced without distortion, that is to say, there should be a linear law between the input and output amplitudes of the circuit. This can be achieved by employing modulators having a linear law relating input and output. If, however, the modulators have a different law, for example a square law, then the amplitude-modulation of the output of the circuit is liable to distortion due to the mixing of the carrier oscillations and said further oscillations in modulator 5. Said distortion can be reduced by feeding the output from filter 3 to modulator 5 via a limiter 4 which in effect modifies the law of the modulators in such sense that the circuit has a linear law. Instead of employing limiter 4 the modulators 1 and 5 may be arranged to operate as a limiter by arranging that the input to modulator 1 from oscillator 2 is small compared with the carrier oscillations and that the input to modulator 5 from filter 3 is large compared with the carrier oscillations applied to modulator 5.

If desired filter 3 may be arranged to provide an output comprising oscillations of a frequency which is the difference between the frequencies of the amplitude-modulated carrier oscillations and the oscillations generated by oscillator 2 and in this case filter 6 is arranged so that its output comprises oscillations of a frequency which is the sum of the frequencies of the amplitude-modulated oscillations and the oscillations fed to modulator 5 from filter 3.

A circuit according to the invention, since it removes phase and frequency modulation from oscillations, will give a double sideband output when fed with a single sideband or vestigial sideband input. It can therefore be advantageously employed in a television receiver for the reception of vestigial sideband signals and will prevent the distortion which would otherwise occur due to the effect known as "asymmetric sideband overshoot." Said distortion occurs in single sideband transmission and also in the transmission of double sideband signals by cable, the signals fed from the cable inevitably being of vestigial sideband nature due to the frequency response of the cable.

It is to be understood that the term "angle-modulated" employed herein refers not only to oscillations which have been purposely modulated in phase or frequency but also to oscillations in which angle-modulation occurs as a form of distortion.

Figure 2 of the accompanying drawing illustrates a detailed circuit arrangement in accordance with the block diagram of Figure 1. In Figure 2, the reference numeral 7 indicates a source of amplitude-modulated oscillations which may be vestigial sideband oscillations having undesired phase or frequency modulation. The oscillations are fed to the control grid 8 of a modulator tube 9 through a coupling condenser 10, the control grid 8 being connected to ground through a leak resistance 11. The oscillations fed to the control grid 8 are the oscillations $F_c$ referred to in connection with Figure 1. Oscillations of a frequency $F_L$ are fed to another grid 12 of the tube 9 from an oscillator comprising a tube 13 which, together with the associated elements shown, constitute a conventional Colpitts oscillator which need not be described in further detail. The oscillations set up at the anode of the tube 13 are fed to the control grid 12 through a coupling condenser 14, the control grid being connected to earth by a leak resistance 15. The anode of the tube 13 is supplied with anode potential from the lead 16 which is connected to the positive terminal of a source of H. T. potential, through a radio frequency choke 17. The two screening electrodes of the tube 9 are also connected to the lead 16 and are decoupled to earth through a decoupling condenser 18. The anode of the tube 9 is connected to a filter consisting of a pair of tuned circuits 19 and 20 corresponding to the filter 3 of Figure 1 which serves to provide an output of frequency $F_c+F_L$. The tuned circuit 19 is connected to the lead 16, whereby anode potential is supplied to the tube 9, the anode being decoupled to earth through a decoupling condenser 21. The high potential end of the tuned circuit 20 is connected to the control electrode 22 of a limiter tube 23 through a coupling condenser 24. The control grid 22 is connected to earth through a leak resistance 25. The tube 23 constitutes the limiter 4 of Figure 1 and is shown as a screen grid tube with the screen electrode 26 connected to the lead 16 and decoupled by a decoupling condenser 27. The anode of the tube 23 is connected by a coupling circuit consisting of a pair of tuned circuits 28 and 29, which are arranged to pass the frequency $F_c+F_L$, to one control grid 30 of a modulator tube 31 which constitutes the modulator 5 shown in Figure 1. The circuit 28 is connected to the lead 16 whereby anode potential is supplied to the anode of the tube 23, the latter being decoupled by a decoupling condenser 32. The other control grid 33 of the tube 31 is connected to the source 7 by a lead 34 so that oscillations of frequency $F_c$ are supplied to the grid 33 which is connected to ground through a leak resistance 35. The screening electrodes of the tube 31 are connected to the lead 16 and are decoupled by a decoupling condenser 36. The anode of the tube 31 is connected to a circuit 37 tuned to the frequency $F_L$ and constitutes the filter 6 of Figure 1, this tuned circuit 37 being connected to the lead 16 whereby anode potential is supplied to the anode of the tube 31 which is decoupled by a decoupling condenser 38. A coil 39 is coupled to the coil of the tuned circuit 37 to provide a double sideband radio frequency output as described in connection with Figure 1.

What I claim is:

1. A circuit for removing angle-modulation, comprising a source of amplitude-modulated oscillations having undesired angle-modulation, means for generating oscillations of constant amplitude and of a constant frequency different from the frequency of said amplitude modulated oscillations, means for combining said amplitude-modulated oscillations with said constant frequency oscillations to provide further oscillations of frequencies which are the sum and difference frequencies of said modulated oscillations and said constant frequency oscillations, means for selecting one of said kinds of oscillations from said further oscillations, means for combining said selected oscillations with said amplitude-modulated oscillations to provide resultant oscillations at frequencies which are the sum and difference frequencies of said selected oscillations and said modulated oscillations, and means for selecting, from said resultant oscillations, oscillations at said constant frequency amplitude-modulated and substantially free from angle-modulation.

2. A circuit for removing angle-modulation, comprising a source of single side-band amplitude-modulated oscillations, means for generating oscillations of constant amplitude and of a constant frequency different from the frequency of said modulated oscillations, means for combining said amplitude-modulated oscillations with said constant frequency oscillations to provide further oscillations of frequencies which are the sum and difference frequencies of said modulated oscillations and said constant frequency oscillations, means for selecting one of said kinds of oscillations from said further oscillations, means for combining said selected oscillations with said amplitude-modulated oscillations to provide resultant oscillations at frequencies which are the sum and difference frequencies of said selected oscillations and said modulated oscillations, and means for selecting, from said resultant oscillations, oscillations at said constant frequency which are double side-band amplitude-modulated and substantially free from angle-modulation.

ERIC McPHAIL LEYTON.

References Cited in the file of this patent

UNITED STATES PATENTS

| Number | Name | Date |
|---|---|---|
| 1,964,522 | Lewis | June 26, 1934 |
| 2,299,619 | Fritz | Oct. 20, 1942 |